United States Patent
Ledford et al.

(10) Patent No.: US 6,817,008 B2
(45) Date of Patent: Nov. 9, 2004

(54) SYSTEM AND METHOD FOR ENTERPRISE-WIDE BUSINESS PROCESS MANAGEMENT

(75) Inventors: Bobby Ledford, Columbus, GA (US); Richard Marks, Pine Mountain, GA (US); Chuck Paul, Cataula, GA (US); Ben Sorrell, Columbus, GA (US)

(73) Assignee: Total System Services, Inc., Columbus, GA (US)

( * ) Notice: Subject to any disclaimer, the term of this patent is extended or adjusted under 35 U.S.C. 154(b) by 0 days.

(21) Appl. No.: 10/356,971

(22) Filed: Feb. 3, 2003

(65) Prior Publication Data

US 2003/0171947 A1 Sep. 11, 2003

Related U.S. Application Data

(60) Provisional application No. 60/358,379, filed on Feb. 22, 2002.

(51) Int. Cl.[7] ................................................. G06F 9/44
(52) U.S. Cl. ........................................ 717/102; 715/513
(58) Field of Search ................................. 717/100–105, 717/120–123; 705/1, 5–9, 38; 715/513; 706/45; 709/101, 246

(56) References Cited

U.S. PATENT DOCUMENTS

| | | | | |
|---|---|---|---|---|
| 6,041,306 A | * | 3/2000 | Du et al. ........................ | 705/8 |
| 6,058,413 A | * | 5/2000 | Flores et al. ................. | 709/101 |
| 6,073,109 A | * | 6/2000 | Flores et al. ................... | 705/8 |
| 6,301,621 B1 | | 10/2001 | Haverstock et al. ......... | 709/246 |
| 6,430,538 B1 | | 8/2002 | Bacon et al. .................. | 705/9 |
| 6,473,748 B1 | | 10/2002 | Archer ......................... | 706/45 |
| 6,505,176 B2 | | 1/2003 | DeFrancesco, Jr. et al. .. | 705/38 |
| 2001/0021913 A1 | | 9/2001 | Leyman et al. ................ | 705/7 |
| 2002/0016729 A1 | | 2/2002 | Breitenbach et al. .......... | 705/9 |

* cited by examiner

*Primary Examiner*—Anthony Nguyen-Ba
(74) *Attorney, Agent, or Firm*—King & Spalding, LLP

(57) ABSTRACT

Implementing a business process management system across an entire enterprise. An exemplary computer-based system for implementing business processes can access data existing on one or more of the computer platforms of an enterprise to implement workflows by a workflow engine. A business process can be broken into business rules that define the process. These business rules can then be categorized into work element categories and translated into workflow elements. Data for supporting the workflow can be identified, including sources of that data within the enterprise. Delegates can be designed to implement each individual workflow element. For example, a delegate can be designed to support the retrieval of data from a computer platform other than the platform hosting a workflow engine. These delegates, which typically comprise XML documents, can be assembled and operated as workflow elements to form the workflow processed by the workflow engine.

22 Claims, 9 Drawing Sheets

Developing Workflow Delegate

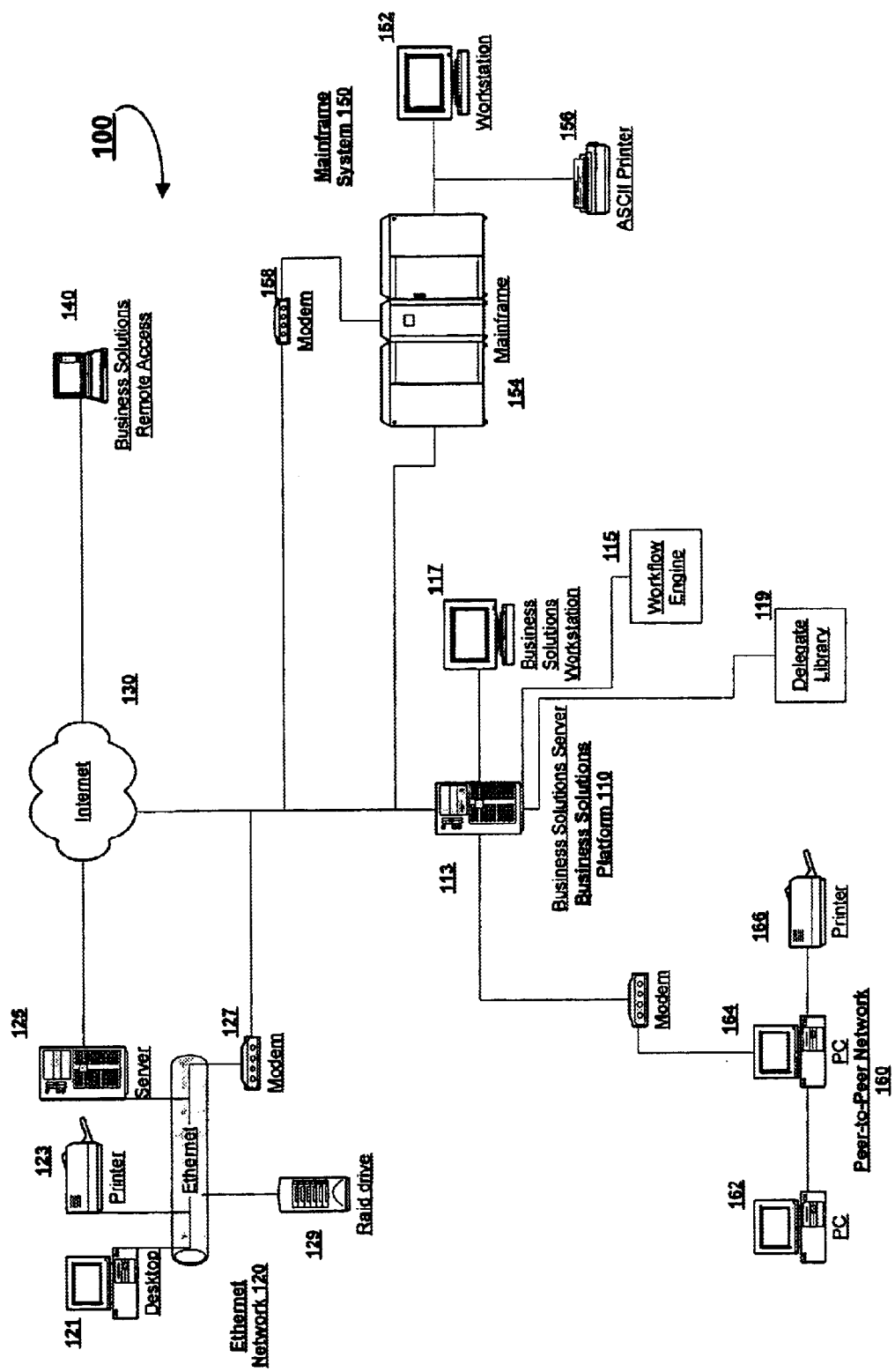
Figure 1. Enterprise-Wide Business Solutions Operating Environment

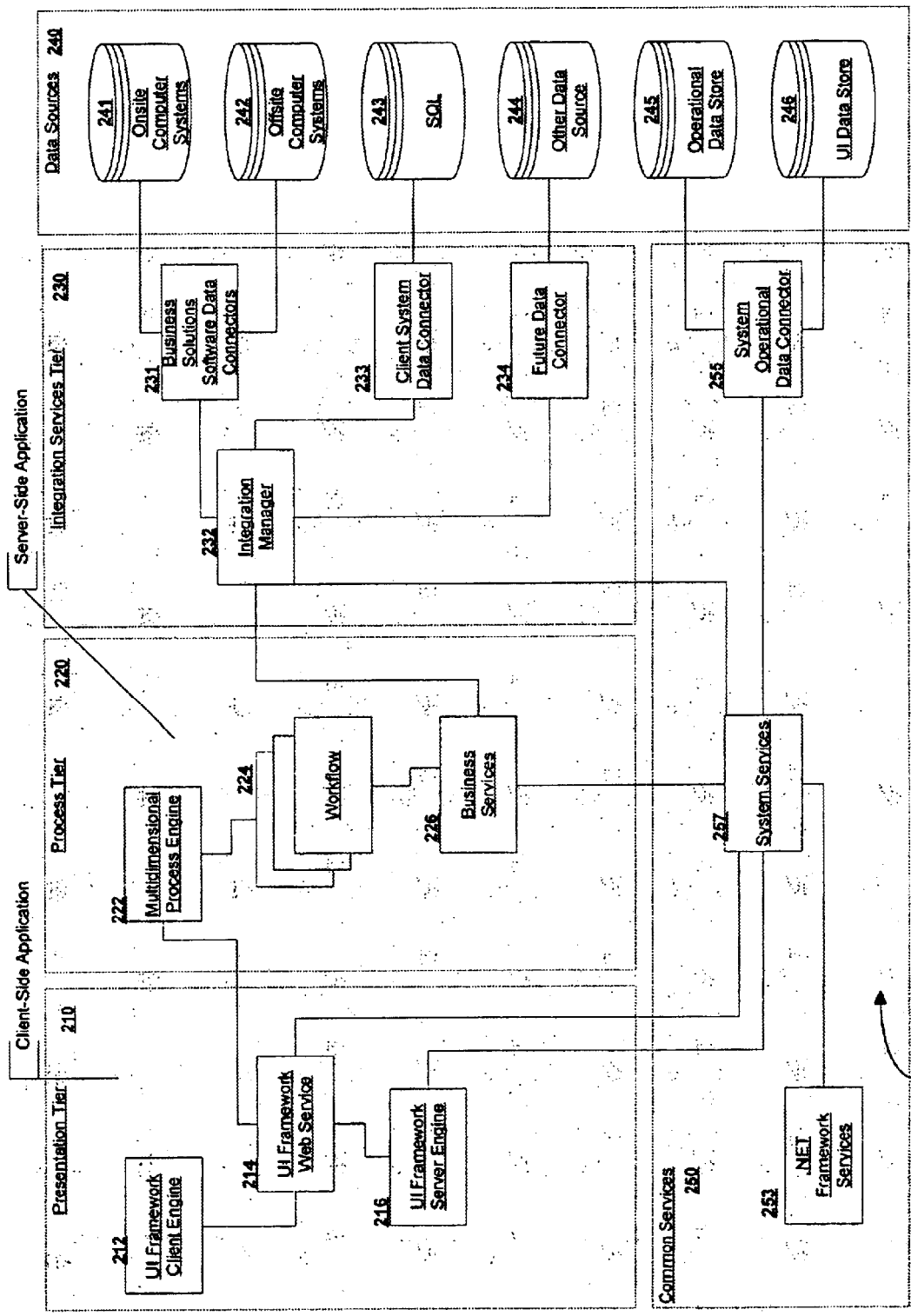
Figure 2. Enterprise-Wide Business Solutions Logical Framework

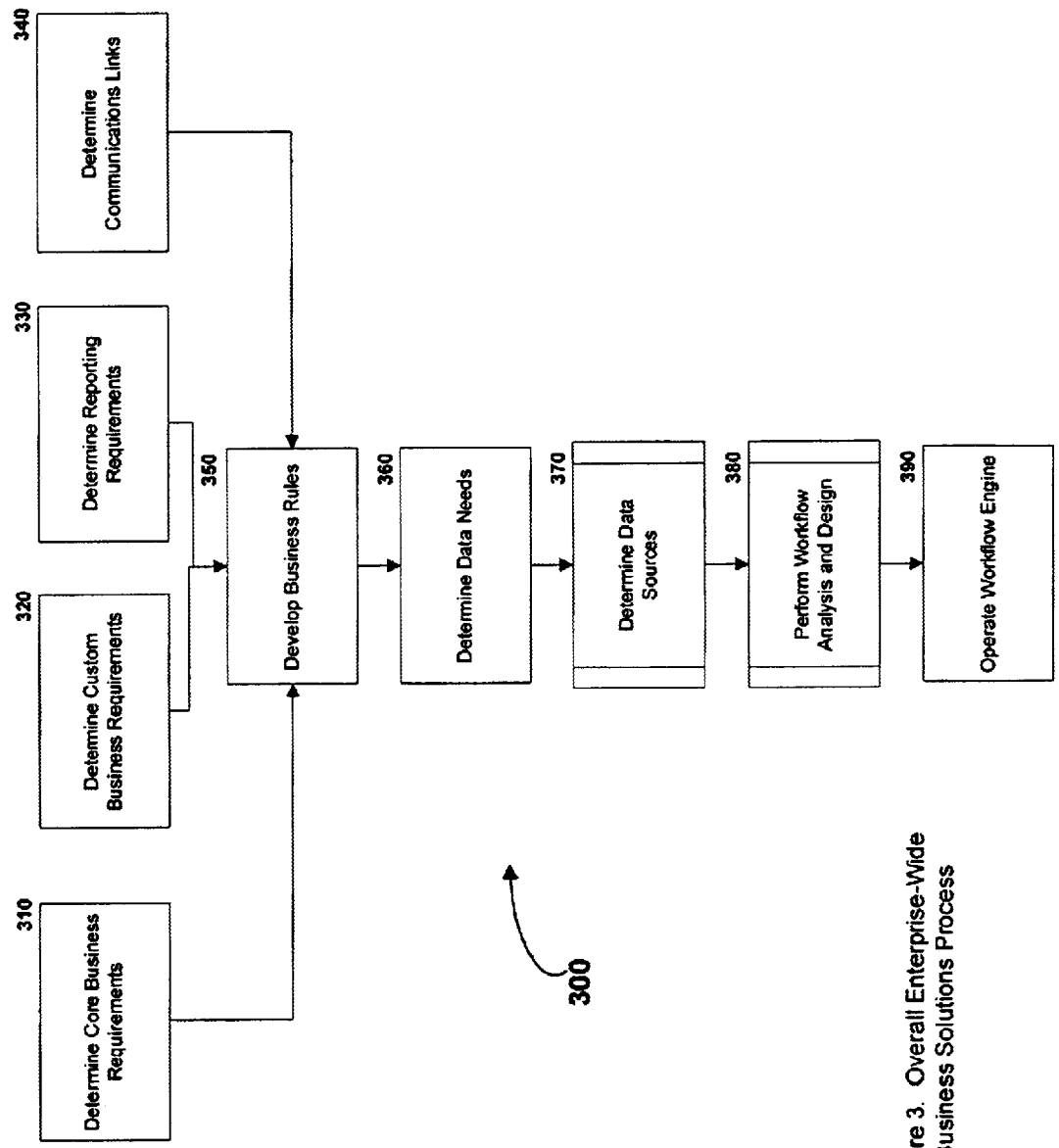
Figure 3. Overall Enterprise-Wide Business Solutions Process

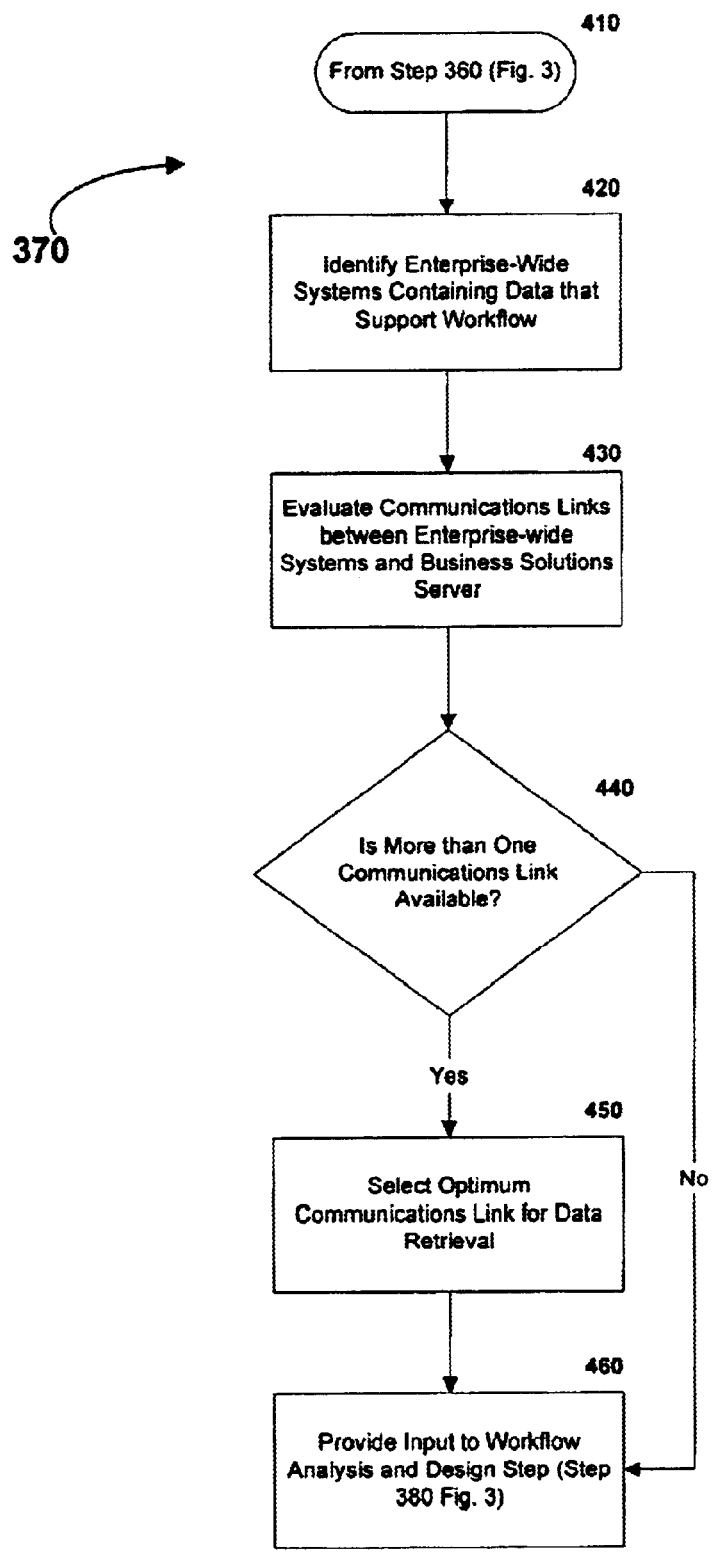
Figure 4. Determining Enterprise-Wide Data Sources

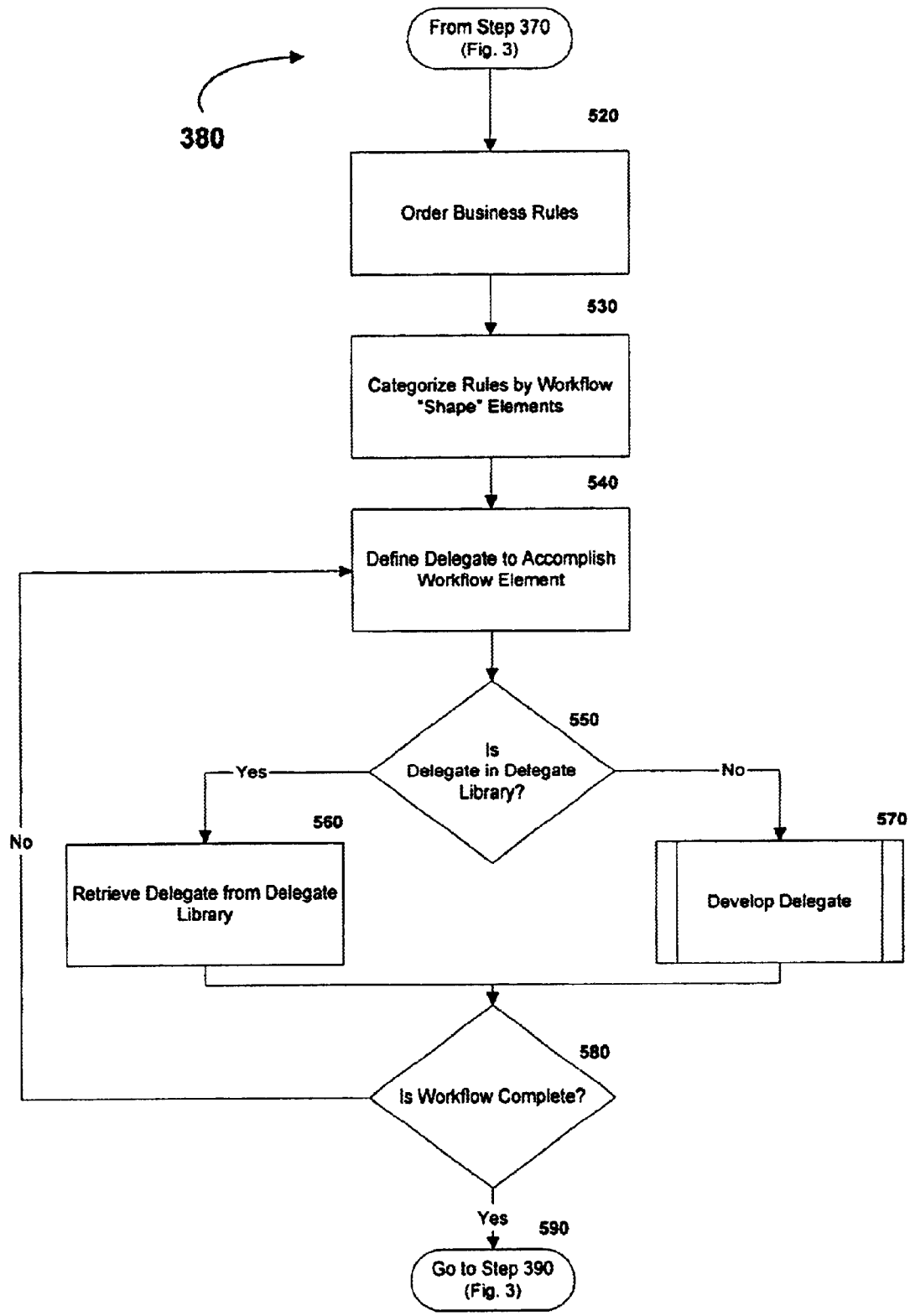
Figure 5. Workflow Analysis and Design

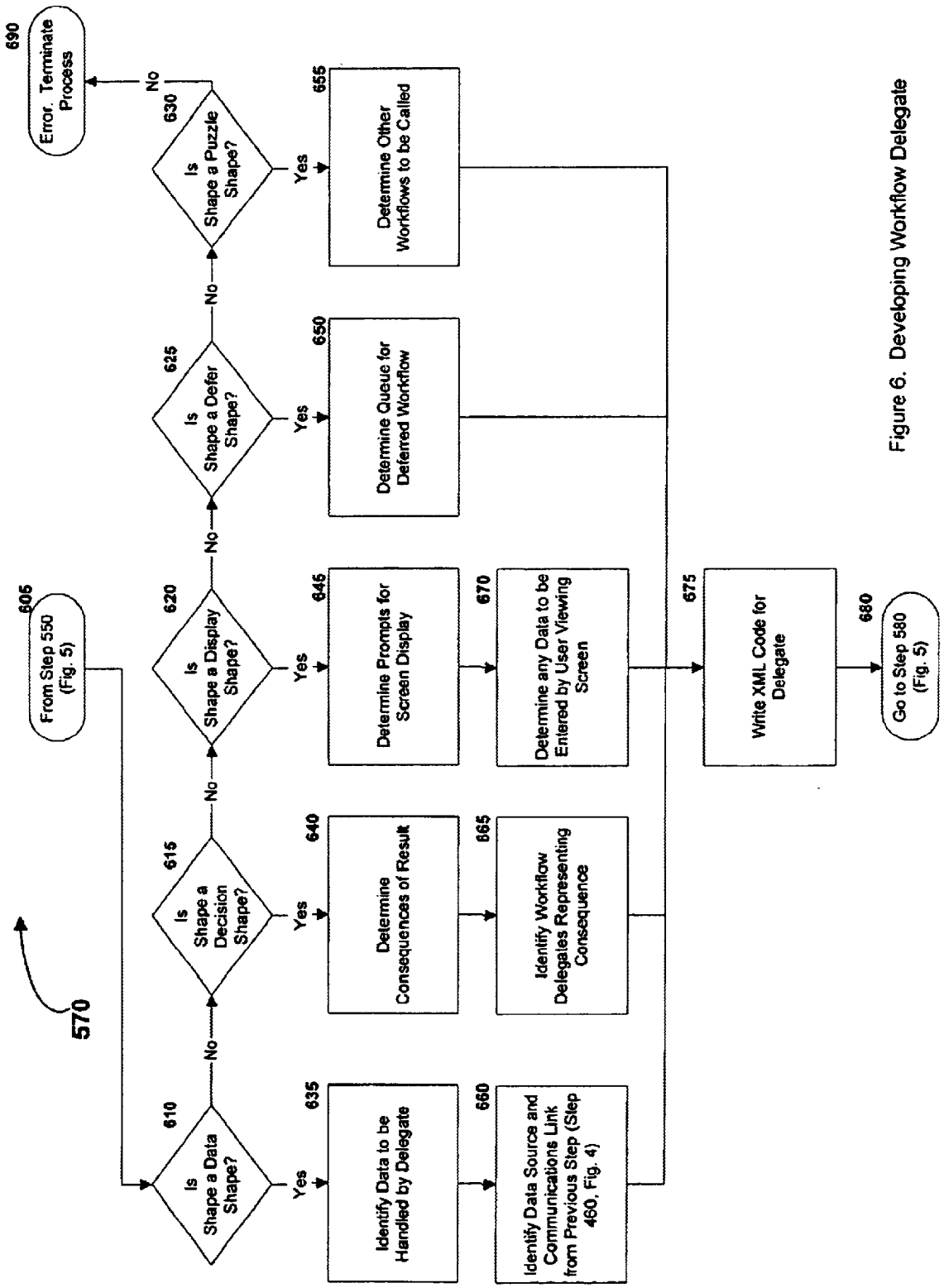
Figure 6. Developing Workflow Delegate

WORKFLOW LOGIC DIAGRAM, SHOWING DATA, DECISION AND DISPLAY SHAPES

WORKFLOW LOGIC DIAGRAM, SHOWING DEFER AND PUZZLE SHAPES

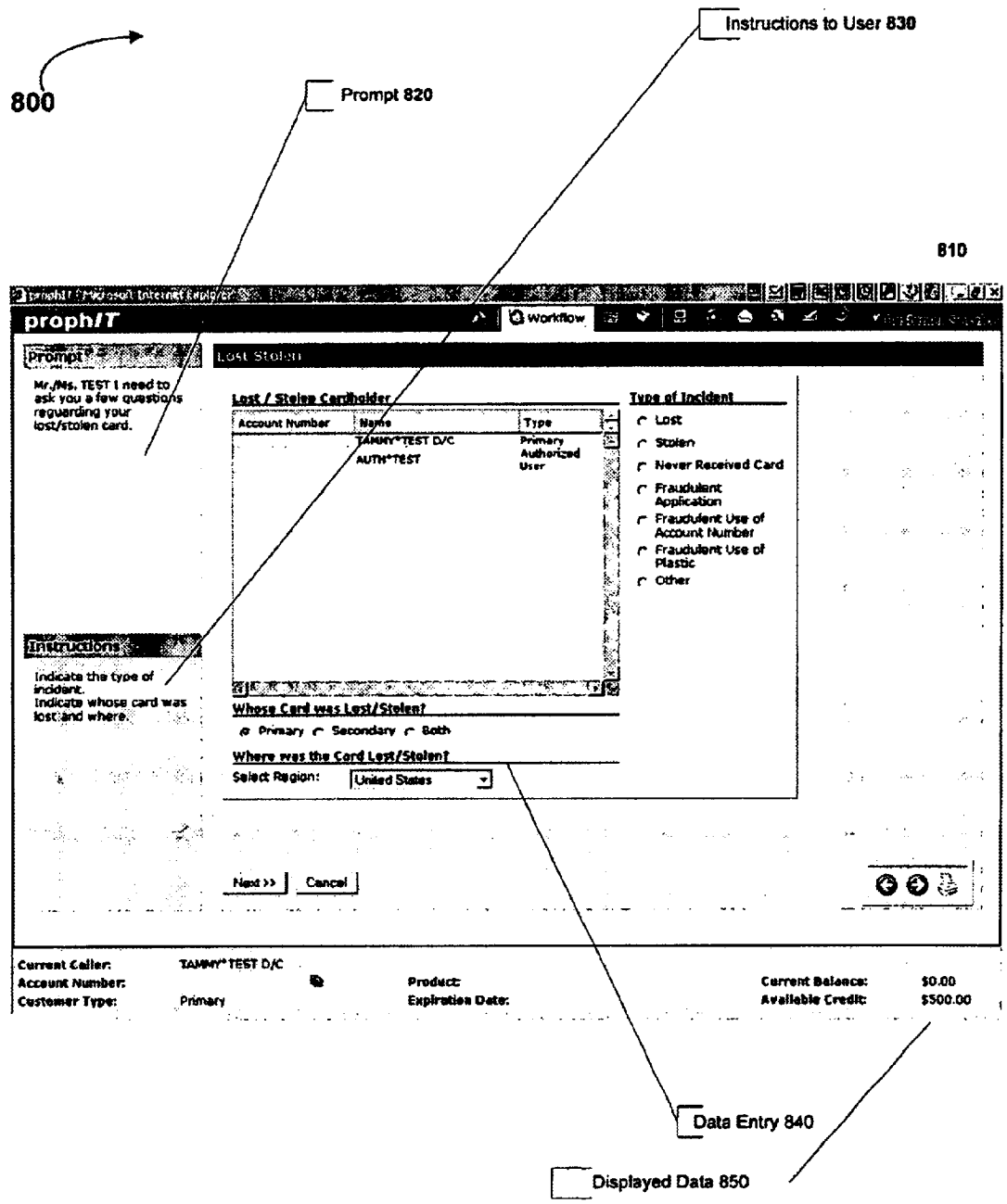
Figure 8. Exemplary Display Shape Workflow Element - Display Screen

SYSTEM AND METHOD FOR ENTERPRISE-WIDE BUSINESS PROCESS MANAGEMENT

STATEMENT OF RELATED PATENT APPLICATIONS

This non-provisional patent application claims priority under 35 U.S.C. §119 to U.S. Provisional Patent Application No. 60/358,379, titled Enterprise-Wide Business Process Management System, filed Feb. 22, 2002. This provisional application is hereby fully incorporated herein by reference.

FIELD OF THE INVENTION

The present invention relates to an enterprise-wide business process management system and method that operates across multiple and diverse computer platforms to deliver workflow-based business process management solutions.

BACKGROUND OF THE INVENTION

Technological advances allow businesses today to rely more and more on computer systems to support business process operations. This reliance did not begin because of the latest computer technology; it began at the dawn of the computer era. However, with the high cost of early computer systems, many businesses had to focus computer operations on a few business processes. For example, accounting processes may have been computerized, but customer service operations remained manual.

As computer technology advanced, computer systems became better, faster, and cheaper. This advancement allowed businesses currently operating a small amount of computer systems to add systems to perform other functions across their enterprise. Often, these added systems were quite different from the earlier computer platforms.

Computer systems typically include operating systems. Operating systems are software programs that control the basic functions of the hardware. Advances in computer hardware technology often result in the development of new operating systems. For example, early computer systems were typically mainframe computers or minicomputers, accessed by terminals, with operating systems such as Unix and VAX/VMS. Current mainframe computers may run the LINUX operating system. For many business applications, mainframe computer systems or minicomputers have been replaced by desktop computers, often linked into computer networks and running operating systems such as the WINDOWS and LINUX operating systems. However, for high-speed and high-volume e-commerce transactions and other data intensive operations, state-of-the-art mainframe systems may be employed.

Although businesses increased their reliance on computer systems across their enterprise, many did not make wholesale system changes. Instead, some groups within an enterprise used one type of system while another group used a newer, and different, system. Each group would manage their own data on their own system.

Parallel with the increase in businesses using computer hardware systems came developments in computer software. One such development was computer-based business process management solutions. One type of solution incorporates a workflow management engine that allows a business to simulate the steps in a business process, identify data sources that support the process, prompt users for data, and make decisions based on the data provided. These computer-based solutions are restricted in their operation to a single computer system, that is, they cannot operate across diverse computer systems within the same enterprise.

These software solutions typically operate to replace manual process steps. For example, one process a business might routinely perform is mass mailings. These mailings may be targeted to different customer bases. A computer-based software solution for this process, incorporating a workflow manager, may allow a user to specify a type of mailing and the software may then assemble a mailing list and print out address labels. The business process would be modeled and each step in the process identified. Then data, such as names and addresses and associated categories, would be identified as well as user interfaces. Once developed, a workflow engine can implement the workflow and automate the mass mailing process.

Another area of the computer industry has also seen significant growth in recent years —the internet, and specifically the World Wide Web. The Web is a non-sequential presentation of information. Information sources are linked together through hypertext links. These links comprise locations on computer servers that contain information. A computer running a browser program is able to move from information location to information location by following the hypertext links. Moving about this web of information is made possible because of standardized operating programming languages and protocols used on the Web. Information is made available through Hypertext Markup Language (HTML) programs. These programs, or documents, tell a browser application how to display text and arrange graphics and provide hypertext links to other information. Under this system, any computer operating system running a browser application can access the information. In this way, the Web can operate across a variety of computer platforms. However, HTML documents and commands are superficial. They do not enable more complex tasks, such as searching for data or running other computer programs.

Another computer language, Extensible Markup Language (XML), has been developed to overcome the shortcomings of HTML and enable more powerful operations, such as e-commerce, over the Web. Also, XML has a place outside the Web, as a means for businesses to exchange and operate on data. XML implements the concept that data can be exchanged in the form of a document. These documents are independent of the data structure as the data was developed or is primarily used. Also, these documents can seamlessly use data from multiple sources.

The prior art includes computer-based software solutions for business process management. Many of these prior solutions are based on workflow managers. However, the prior art is unable to operate across different computer platforms to support business process management solutions. So, if a business process management solution was running on one computer platform, for example a mainframe computer, and needed data from another computer platform operating in the same business enterprise, such as a local area network (LAN) comprising personal computers, the business process management software could not access the LAN to get the data. Consequently, the enterprise must copy the data from the other computer platform onto the mainframe. This requirement puts the same data in at least two places, requiring both data sources to be updated when a change is made to the data. As a result, this requirement duplicates both computer resources and data management efforts.

What is needed is a business process management solution that operates across multiple and diverse computer platforms, allowing a workflow engine in the process management solution to access data and other system assets on any computer platform operating in the enterprise, thereby avoiding duplicating data and the need for wholesale replacement of computer systems.

SUMMARY OF THE INVENTION

The present invention provides a method for operating an enterprise-wide business process management software solution across multiple and diverse computer platforms.

An innovative computer-based system for implementing business processes can access data existing on one or more of the computer platforms of an enterprise to implement workflows by a workflow engine. Workflows can be defined as computer software representations of an activity or activities performed by an enterprise comprising a business process. A workflow engine is a computer software program component that operates on the computer software comprising the workflow to automate the activity. For an enterprise, a business process can be broken into business rules that define the process. These business rules can then be categorized into work element categories and translated into workflow elements. Data for supporting the workflow can be identified, including sources of that data within the enterprise. Delegates, which are discrete segments of computer code that can represent a business rule, can be designed to implement each individual workflow element. For example, a delegate can retrieve data from a computer platform other than the platform hosting a workflow engine. The workflow can then be assembled and operated with the workflow engine to accomplish the business process, that is, to perform many of the workflow elements in an automated fashion.

A delegate can represent a process step, or business rule, that is unique to the workflow for which it was designed. For example, the delegate can comprise a risk calculation unique to the business process and enterprise. A different delegate can represent a generic process step, such as prompting a user for an account number. A more generic delegate may be able to be used in more than one workflow. These more generic delegates may be stored in a delegate library, allowing a workflow designer to reuse these delegates when assembling different workflows. These delegates may comprise XML documents and multiple delegates can be assembled into an XML document comprising the computer software, or code, for a workflow. Additionally, to aid in developing the computer code for the workflow, delegates may be categorized by the type of task they perform. This categorization may be used to assemble a workflow using a visual design tool.

The aspects of the present invention may be more clearly understood and appreciated from a review of the following detailed description of the disclosed embodiments and by reference to the drawings and claims.

BRIEF DESCRIPTION OF THE DRAWINGS

FIG. 1 is a block diagram that presents a representative operating environment for an exemplary embodiment of the present invention.

FIG. 2 is a block diagram that presents the logical framework for an exemplary embodiment of the present invention.

FIG. 3 is a block diagram that presents the overall process flow for an exemplary embodiment of the present invention.

FIG. 4 is a flow diagram that presents details on a process step of determining enterprise-wide data sources in accordance with an exemplary embodiment of the present invention.

FIG. 5 is a flow diagram that presents details on a process step of designing and analyzing workflows in accordance with an exemplary embodiment of the present invention.

FIG. 6 is a flow diagram that presents details on a process step of developing workflow delegates in accordance with an exemplary embodiment of the present invention.

FIG. 8 presents a representative display screen resulting from the operation of a display shape in a workflow for an exemplary embodiment of the present invention.

DETAILED DESCRIPTION OF THE EXEMPLARY EMBODIMENTS

Figure 7A:
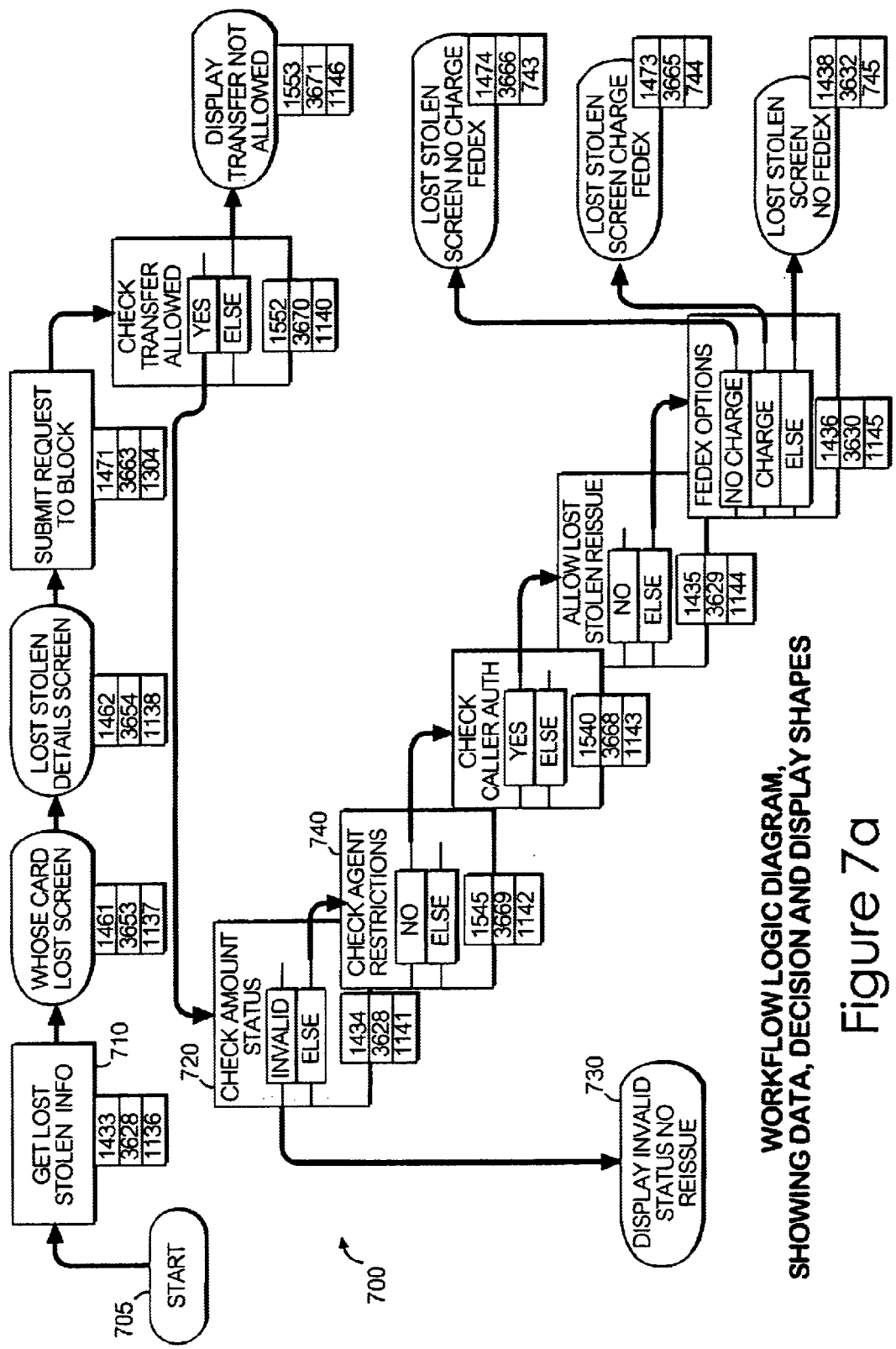
FIG. 7a presents an example workflow logic diagram, showing data, decision, and display shapes for an exemplary embodiment of the present invention.

Exemplary embodiments of the present invention provide a method and system for using a computer-based software program to manage business processes across an enterprise where the enterprise has multiple and diverse computer platforms.

FIG. 1 presents an operating environment 100 for an exemplary embodiment of the present invention. Referring now to FIG. 1, the operating environment 100 comprises a Business Solutions Platform 110; a computer network 120, such as an Ethernet; a mainframe system 150; and a peer-to-peer network 160. The Business Solutions Platform 110 includes a Business Solutions Server 113 and a Business Solutions Workstation 117 and provides the platform, or computer hardware, for a computer software program comprising a server component of an exemplary embodiment of the present invention. The Business Solutions Server 113 comprises, for example, a Compaq DL380 server or similar device running Windows 2000 Advanced Server or other server software. The computer software program server component can reside on the Business Solutions Server 113 and can be managed through the workstation 117. A Business Solutions Remote Access computer 140 connected to the Business Solutions Server 113 through a distributed computer network, such as an Internet 130, also can remotely manage operations of the computer software program server component.

The computer software program server component of the exemplary embodiment is a multi-tiered program. Its logical framework is described in detail below, in conjunction with FIG. 2. A primary function of the computer software program server component is to manage and implement workflows using a workflow engine 115 and a primary function of the Business Solutions platform 110 is to host the computer software program server component.

The operating environment 100 also includes a computer network 120, such as an Ethernet. This network includes a server 125 and any number of desktop computers 121. A computer software program comprising a client component of an exemplary embodiment of the present invention may reside on any one of the desktop computers 121. The client component residing on one or more desktop computers 121 and the server component residing on Business Solutions Server 113 operate in tandem to design and operate a workflow. The client component can be used to develop delegates and assemble delegates into workflows. The client component also allows interaction with the Business Solutions Server 113 when a workflow is implemented by the Business Solutions Server 113. This interaction may allow a user to see display screens and input data or take other actions triggered by running the workflow.

The network may also include other peripheral equipment, such as a printer 123, a RAID Drive 129 (a redundant array of independent disks for storing data), or a modem 127. The network may also contain other peripheral equipment, such as plotters, scanners, optical drives, laptop docking stations, and a network administrator's workstation (all not shown).

The computer network 120 represents a configuration for a typical LAN. In a business, a LAN may connect a wide variety of employees. The LAN may serve as a portal to a distributed network, such as the internet 130 and the employees may be able to browse the internet 130, or an intranet from their desktop computer, such as desktop 121. The employees can share common resources, such as printers, and use resources such as e-mail and common storage areas. Employees can use word processing, spreadsheet, presentation, and database software as with a regular desktop computer, plus enjoy the benefits of connectivity to other computers and the internet 130.

The operating environment 100 may also include a peer-to-peer network 160. This network differs from the computer network 120 in that the peer-to-peer network 160 does not include a server. Instead, each desktop PC 162, 164 in the network is connected to each other. An exemplary client component may reside on any one of the desktop PCs 162, 164 to interact with the server component residing on the Business Solutions Server 113. The individual desktop PCs 162, 164 may have peripheral equipment, such as a printer 166 and a modem 168. If shared, the peripheral equipment becomes part of the network. The network may also contain other peripheral equipment, such as plotters, scanners, and optical or ZIP drives (all not shown), i.e., any type of peripheral equipment that may be attached to an individual desktop PC 162, 164 could be a component of a peer-to-peer network.

Those skilled in the art will recognize that the peer-to-peer network 160 is not as powerful as a LAN because this type of network typically comprises only a few desktop computers and peripheral equipment. Data storage capacity is typically limited to the storage drives on the individual computers. The peer-to-peer network 160 may be used for a small working group within an enterprise, perhaps a group that does not need the connectivity and other resources offered by a LAN, or a group remotely located from the main concentration of employees in an enterprise.

The operating environment 100 also includes a mainframe system 150. Mainframe computers can be operated through a workstation 152, often referred to as a terminal. The mainframe system 150 may also include peripheral equipment such as an ASCII printer 156 and a tape storage drive 158. The system may also have other peripheral equipment, such as plotters, scanners, and other storage drives (all not shown).

Mainframe computers are used for managing and manipulating large amounts of data very quickly. Although desktop computers, possibly configured in LANs, have become increasingly more powerful, businesses still have operations that are more efficiently done using mainframe computers, for example, managing e-commerce. Also, many businesses invested in mainframe computers when early-generation personal computers where unable to meet the computing demands. The high investment cost of these systems often necessitates their continued use.

The variety of operating systems or platforms in the operating environment 100 is connected via one or more computing networks or interconnections. The systems may be connected through the internet 130. Alternatively, the systems may be connected directly, perhaps through the modems 127, 168 or other direct connections between computer systems. These connections may be used to transfer information between the systems. Also, these connections may allow for communication between the client and server components of an exemplary embodiment of the present invention.

FIG. 2 presents the logical framework 200 of computer software functional modules that implement aspects of an exemplary embodiment of the present invention, covering both the client and server software components. Referring to FIG. 2, the logical framework 200 consists of three tiers, a Presentation Tier 210, a Process Tier 220, and an Integration Services Tier 230. The logical framework 200 also includes data sources 240 and common services 250.

The Presentation Tier 210 is responsible for the user interface (UI) between the exemplary logical framework 200 and a user. This tier comprises further software functional modules, including a UI framework client engine 212, which is connected to a UI framework web service 214, which is in turn connected to a UI framework server engine 216. The UI framework client engine 212 may reside on any number of client computers, such as desktop computer 121 and/or desktop PC 162, 164 (FIG. 1). The UI framework web service 214 and the UI framework server engine 216 software functional modules may reside on the Business Solutions Server 113 (FIG. 1).

The Presentation Tier 210 is preferably a robust UI framework that may use "WINDOWS" application server technologies, specifically the ASP.NET environment. The user interface is persisted in a UI data store 246, with both client- and server-side components working together to dynamically render pages using sophisticated Extensible Stylesheet Language (XSL) transforms. These transforms enable a browser software program to understand how information in an XML document is to be presented by the browser. The UI data store 246, which may reside on the Business Solutions Server 113 (FIG. 1), is assessable through a common services layer comprising a System Services 257 and a Systems Operational Data Connector 255. The entire application may run from a single Web page, with an XML Web service used as the boundary object between the presentation and services tiers.

The Process Tier 220 consists of both workflow and business services. Every action of a process managed by the exemplary embodiment is part of a workflow 224, which comprises one or more definition steps that convert business rules that govern the process to actions. A multidimensional process engine 222, also referred to herein as a workflow engine, executes definitions of a workflow 224 on a step-by-step basis, driving both the screen display and the actions associated with each step. A workflow 224 can trigger a display to the user, retrieve data, make a decision, run a sub-workflow, or defer a workflow 224 for completion by another user. Also residing within the Process Tier 220, Business Services 226 encapsulate common functionality such as display of user prompts, instructions associated with each workflow step, evaluation of business rules associated with workflow decision steps, and management of workflow routing from one user to another. They also contain boundary services for an Integration Services Tier 230. The functional modules for the Process Tier 220 reside on the Business Solutions Server 113 (FIG. 1).

Workflows 224 can be defined as a computer software representation of an activity or activities performed by an enterprise comprising a business solution process. These activities are typically routine business solution processes amenable to automation over at least part of the process. The computer software representations can be developed from business rules that describe the business solution process. Each of the business rules may define a workflow element of a workflow 224. Delegates, which are discrete segments of computer code that can represent a business rule, can be designed to implement each individual workflow element. In defining these delegates, the workflow element may rely on data maintained by the business enterprise. Also, a delegate may represent a generic workflow element, that is, a step in a business solution process that may be common to many business solution processes. These generic delegates may be able to be reused in representing a different workflow.

The Integration Services Tier 230 is a set of services that enable the exemplary logical framework 200 to connect to a multitude of disparate data sources, including data sources resident on other computer systems implementing different operating systems from the operating system of the Business Solution Server 113 (FIG. 1). When a data request is received from a workflow 224, an integration manager 232 evaluates the request and instantiates an appropriate data connector, such as the business solutions software data connectors 231 or client system data connector 233. Each data connector 231, 233 uses a data handler object to access an associated data source, such as an onsite computer systems data source 241, an offsite computer systems data source 242, and an SQL data source 243. This data handler is designed to access the requested data using the proper syntax required for that computer system and to perform the data read or write. Any number of other data sources 244 can be integrated by adding corresponding future data connectors 234 and handlers. The functional modules for the Integration Services Tier 230 reside on the Business Solutions Server 113 (FIG. 1).

For example, a workflow 224 automating a customer service call for an e-business company may require transaction information stored on a mainframe computer used to conduct e-commerce transactions. The workflow 224 would include a workflow element, coded as a delegate, that causes the integration manager 232 to instantiate a business solutions software data connector 231 that includes a data handler designed to access the onsite mainframe computer data source 241.

Although FIG. 2 presents Data Sources 240 grouped together, this grouping is merely a logical grouping. The physical location of the data sources can be wide-ranging. In other words, the exemplary logical framework 200 is able to access all of the required data sources, regardless of where in the physical operating environment 100 (FIG. 1) the source exists.

A Common Services Tier 250 supports the Presentation 210, Process 220, and Integration Services 230 Tiers. A system services function 257 provides access to system configuration information, the ability to log events and errors, an interface into a software security service, and other critical system level functionality. The System Services function 257 also provides access to the pre-built functionality provided by the .NET Framework Services 253 and connects to the system operational data connector 255, which instantiates data handlers to retrieve data necessary for operating the software functional modules of the exemplary logical framework 200. One skilled in the art would appreciate that other software tools that support XML document development and implementation or similar platform-independent languages could be used in alternative embodiments of the present invention. The functional modules for the Common Services Tier 250 reside on the Business Solutions Server 113 (FIG. 1).

The exemplary logical framework 200 enables a business solution process to be developed into a computer software representation of the activities comprising the business solution process as they are performed by an enterprise. The exemplary logical framework 200 facilitates the design of a delegate to represent each activity, or workflow element, and the assembly of those delegates into workflows 224. The exemplary logical framework 200 also enables the workflow 224 to be operated on by the multidimensional process engine 222, or workflow engine, resulting in the automation of the business solution process. During the operation of the workflow 224, data supporting the workflow can be retrieved from data sources contained on computer systems other than the computer system hosting the multidimensional process engine 222 even if the computer system containing the data source runs a different computer operating system.

FIG. 3 presents a process 300 for developing and operating a computer software representation of a business solution process in accordance with an exemplary embodiment of the present invention. Referring now to FIGS. 2 and 3, steps 310, 320, 330, and 340 can be performed in parallel. At step 310 of the exemplary embodiment of the present invention, core business requirements of a business process being managed by the exemplary embodiment are determined. This determination is made by individuals familiar with the business process being managed. For example, if the business process being modeled is customer service interaction with a customer who has lost or had stolen her credit card, these core business requirements may include:

Will customers contact customer service by phone, mail, or the internet?

Will cards and Personal Identification Numbers (PINs) be issued when card is reported lost or stolen?

What are the account statuses that would prevent a card or PIN from being issued?

Will the customer service representative be prompted and have instructions displayed if the account has a past due balance or the account is over limit?

Will a fee be charged for special delivery options?

Can replacement cards be sent to an address other than the billing address?

Is additional verification required to issue a card to an alternative address?

How long will the card processing association maintain a lost/stolen card report?

At step 320, custom business requirements are determined. Custom requirements are those business requirements not captured at step 310. These requirements may reflect special circumstances not covered in core requirements that may require the business process to take additional or different actions as compared to the business process envisioned using the core requirements. For example, again using the exemplary situation where the business process being modeled is customer service interaction with a customer who has lost or had stolen her credit card, these custom business requirements may include:

Can the requester of a replacement credit card be someone other than the primary or co-applicant on the account?

Do fraudulent charges exist on the account?

At step 330, any reporting requirements for the business process are determined. This determination may be based on records-keeping requirements or process monitoring. Reporting requirements may be satisfied by a workflow 224 generating electronic computer files or paper copies that can be stored or by generating a prompt on an operator's computer screen. Each reporting requirement can be a separate action within the workflow 224. For example, in the lost/stolen credit card example discussed above, a workflow 224 may generate an electronic computer file with the account number, cardholder name, date and time the lost/stolen card was reported, the customer service representative's identifier number, and a case number. Some or all of this information may also be printed as part of a paper report. Additionally, a prompt may be sent to a supervisor's computer screen presenting some or all of this information.

At step 340, the communications links are determined. These communications links typically represent the computer network links, or system interconnections, that allow a workflow 224 access to all the data needed to support execution of the delegates comprising the workflow 224. As discussed previously in association with FIG. 2, software components that function in support of the exemplary embodiment include the integration manager 232, which instantiates data connectors 231, 233, 234 that retrieve data in support of a workflow 224. This software functionality, implemented with a platform independent computer language such as XML, enables the workflow 224 to manage a process across computer platforms in an enterprise. For example, in the lost/stolen credit card example discussed above, a workflow 224 may instantiate an action that causes the integration manager 232 to instantiate a data connector to retrieve applicant and co-applicant information associated with an account from a storage drive on an Ethernet network and to instantiate a different data connector to retrieve data on account activity from a mainframe computer. In Step 340, all possible communication links are determined. Subsequent steps determine the precise data needs and the sources of that data.

Steps 310, 320, 330, and 340 all precede step 350. At step 350, business rules are developed. Business rules represent the steps of the business process being managed, that is, the steps that must be performed and the order in which they must be performed to accomplish the objectives of the business process. In the exemplary embodiment, business rules are categorized into five types of functions, or workflow elements: data, decision, display, defer, and puzzle. These workflow elements, or delegates, are described as shapes, because visual symbols can be used to build a representation of the process flow for the business process being managed. These five shapes are discussed in more detail in association with FIG. 6 and illustrated in an example associated with FIGS. 7a and 7b.

For example, in the lost/stolen credit card example discussed above, business rules governing the lost/stolen credit card reporting and reissue process from the start of the process to the determination whether to enter the re-issue portion of the workflow, i.e., the first portion of the workflow, may include:

1. Get lost/stolen card information: AccountNumber, CustomerName, AddressLine1, AddressLine2, City, StateorProvince, Zip, Country, AccountStatus1, AccountReason1, AccountStatus2, AccounReason2, AccountStatus3, AccountReason3, LastAddressChange, LastCardRequest, LastPINRequest, and DateOfLastOrder, where this list of information indicates computer record fields containing data;
2. For given account status codes, do not allow access to workflow;
3. Display screen to operator stating that card has already been reported lost/stolen;
4. Display "Whose Card Lost Screen";
5. Display "Lost/Stolen Details Screen";
6. Submit data to block account on mainframe;
7. Determine if account is eligible for transfer. Given account status codes indicate that account is not eligible for transfer;
8. If not eligible for transfer, display prompt to operator;
9. Get updated account summary data;
10. For given account status codes, do not access reissue portion of workflow;
11. If account status is invalid, display screen to operator indicating that an invalid status prevents reissue of the card;
12. Is caller authorized to access workflow, i.e., is caller the primary or co-applicant on the account? If not, go to "Submit Transfer No Reissue," if so, go to "Allow Reissue."

At step 360, data needs are determined from the business rules. This determination is made by identifying each rule developed at step 350 and determining what data is needed. For example, referring to the business rules presented above for the lost/stolen credit card example, data needs include the cardholder's account number, name, and address; the account status and reasons for that status; the last time the address was changed for the account, the last time a card or PIN was requested for the account; and the date of last order for the account. In addition to these data, data can also be collected during the workflow process. In the example above, the customer service representative collects details on the lost or stolen card when prompted by a display screen (see exemplary business rule 5, above).

At step 370, data sources are determined. This determination is made by associating the data needs identified at step 360 with sources of that data. These sources may exist on a variety of computer platforms across an enterprise and may include databases identified in the Data Sources 240 layer or may include other sources, such as data gathered from a person during implementing a workflow comprising the business process. This step is discussed in greater detail in association with FIG. 4, below.

At step 380, workflow analysis and design are performed. This step translates the business rules, data needs, and data sources determined at steps 350, 360, and 370, respectively into a computer software model of the business process. Visual programming techniques, such as VISIO, can be used to support the design of a workflow. Step 380 is discussed in greater detail in association with FIG. 5, below.

At step 390, a workflow engine is operated. This operation implements the automated process represented in the computer model of the workflow designed at step 380. In the exemplary embodiment, the multidimensional process engine 222, residing on the Business Solutions Server 113 (FIG. 1), operates the workflow. In the lost/stolen card example discussed above, a lost/stolen card workflow may be initiated by a cardholder calling into a customer service center to report her card stolen. A customer service representative may then initiate the workflow engine, which then takes the cardholder and customer service representative through the workflow, including prompting the customer service representative to take data and communicate with the cardholder and retrieving data, as necessary, across the enterprise to support the reporting and reissue process.

FIG. 4 presents the process for determining enterprise-wide data sources to support developing a computer operable model of a business solution process for an exemplary embodiment of the present invention. Referring now to FIGS. 3 and 4, at step 410 the process is initialized by completing step 360, where data needs are identified. At step 420, all of the enterprise-wide systems containing any of the data determined in step 360 are identified. This identification step can be done manually be a person or automatically, such as by a computer querying a database that associates data types with enterprise-wide systems containing those data.

At step 430, the communications links determined at step 340 are evaluated to ensure that all required links have been identified. At step 440, the process determines if multiple links between the Business Process Server 113 (FIG. 1), which contains the computer software component of the exemplary embodiment of the present invention, and the system containing the data source exist. If multiple links do exist, then the process moves to step 450 and an optimum communications link. This optimization may be based on anticipated communications traffic over the links and the available bandwidth to service the traffic, the reliability of the connection, transmission security, and/or other factors.

Steps 440 and 450 are repeated for all systems containing data. After the optimization or, if only one communications link exists, then the process moves to step 460 and the identified enterprise-wide systems containing the required data and optimal communications links are provided to the workflow analysis and design step, step 380. Steps 430, 440, 450, and 460 can be done manually by a person or automatically, such as by a computer program written to identify the data sources and perform the communications link optimization.

As an example, the systems containing required data are identified, perhaps by one or more persons familiar with the data structure of the enterprise. As an illustration, these systems may include current account activity from data storage drives on a mainframe 154, account history from a RAID drive 129 on an onsite Ethernet network 120, and personal account information on a CD-ROM on an offsite peer-to-peer network 160. Then, the communications links between the systems containing the data are evaluated and a determination is made whether multiple links between systems exist. For example, the offsite peer-to-peer network 160 may be accessible through a dedicated line and the internet 130, where the dedicated line has a large fraction of its bandwidth dedicated to billing transactions. In the optimization step, it may be determined that security or other reasons necessitate using the dedicated line rather than an internet connection. The evaluation and optimization steps may be performed by a network administrator familiar with the communications infrastructure and the demands on that infrastructure. Once all links have been selected, the data sources and communications links would be provided to the task of analyzing and developing the workflow.

FIG. 5 presents a process 380 for analyzing and designing a workflow in the exemplary embodiment of the present invention. Referring now to FIG. 5, step 510 initiates the process, by receiving the data source and communication links information from step 460 (FIG. 4). At step 520, the business rules are ordered. This ordering entails taking the business rules developed in step 350 (FIG. 3) and arranging them in a logical order that enables the process to be automated. In other words, the business rules are put into a logical order that reflects the sequence of events performed during the actual business process.

Figure 7B:
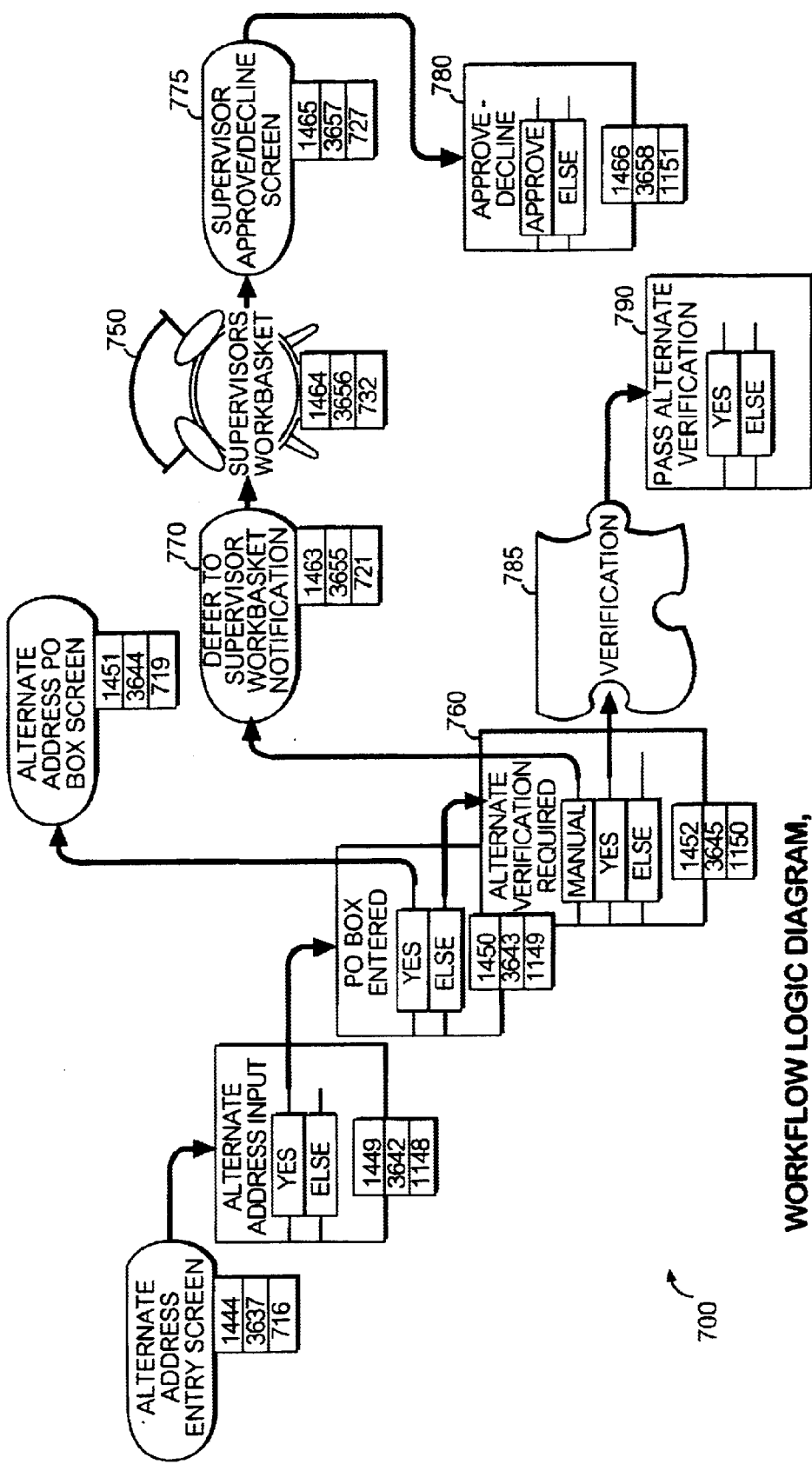
FIG. 7b presents an example workflow logic diagram, showing defer and puzzle shapes for an exemplary embodiment of the present invention.

At step 530, each rule is categorized by workflow "shape." This categorization process is used in the exemplary embodiment to facilitate constructing the arrangement and interrelationships of the workflow. The exemplary embodiment employs five shapes: data, decision, display, defer, and puzzle. These shapes are discussed in greater detail in association with FIG. 6, below and are illustrated in FIGS. 7A and 7B. One skilled in the art would appreciate that other shapes could be employed to represent categories of activities. Similarly, workflows could be designed without using the visual tools represented by the shapes without deviating from the scope of this invention.

At step 540, the "delegate" is defined to accomplish the first workflow element. As used in the exemplary embodiment, a delegate is a computer code that performs a specific task, whether that task is to make a decision or retrieve or transmit data. The task is initiated when the delegate is called in an XML document that contains the workflow.

Table 1 presents a portion of a representative XML document for a typical workflow. A box has been included in Table 1 around a representative coding of a delegate command, in this case a delegate that displays to a customer service representative an account number.

TABLE 1

XML Document for Workflow

```
<WorkflowRuntimeDefinition>
    <Workflow Id="1" Type="DisplayAccount" Version="1.0.0">
        <Properties>
            <Property Name="SomeWorkflowNamespace">Some Workflow Value</Property>
        </Properties>
        <Nodes>
            <Node Id="1" Name="Start" Type="Start">
                <Navigation CanCancel="false" CanDefer="false" CanPrevious="false" CanNext="true"/>
                <Properties/>
                <DataMappings/>
                <Successors>
                    <Successor NodeId="2"/>
                </Successors>
            </Node>
            <Node Id="2" Name="Get Account Number" Type="Display">
                <Navigation CanCancel="false" CanDefer="false" CanPrevious="false" CanNext="true"/>
                <Properties/>
                <DataMappings>
                    <Input/>
                    <Output>
                        <DataMapping Name="Input.AccountNumber"
```

TABLE 1-continued

XML Document for Workflow

Locator="TSYS.DataMappers.ProphITXMLMapper" Type="System.String"/>
        </Output>
      </DataMappings>

```
    <DelegateMethods>
        <DelegateMethod
Namespace="TSYS.Delegates.Common.MyDelegates.GetAccountNumber"
AssemblyName="MyDelegates" DelegateType="Display"/>
```

In the exemplary embodiment, delegates comprise XML coding that can be reused by different workflows. As such, a library can be maintained that stores delegates for use in subsequent workflows. For example, a delegate to retrieve an account number could be used in a workflow supporting a customer service business process, a billing business process, or an e-commerce business process for the same enterprise. Once the delegate is developed for one of the workflows, that same delegate can be used for workflows designed subsequent to its development.

At step 550, the process determines if the delegate needed for a workflow element is in the Delegate Library. If yes, the delegate is retrieved from the Delegate Library at step 560. If not, the delegate is developed. This development entails coding in computer language, such as XML, the tasks to be performed by the delegate. This step is described in greater detail below in association with FIG. 6. After the delegate is retrieved or developed, the process goes to step 580 and determines if the workflow is complete. If the workflow is complete, the process moves to step 390 (FIG. 3). If not, the process returns to step 540 and repeats steps 540 through 580.

FIG. 6 presents a logical flow diagram illustrating the process 570 for developing a workflow delegate, a step in the workflow analysis and design process discussed above in conjunction with FIG. 5. Referring to FIGS. 3, 5 and 6, at step 605, the process is initiated from decision step 550, when it is determined that a delegate does not exist in the Delegate Library. At step 610, the process determines if the delegate is a "Data" shape, as designated at step 530, associated with a delegate to perform a data handling function. In other words, was it decided at step 530 that this delegate will retrieve data as part of the workflow. If the result is "Yes," the process moves to step 635. At step 635, the process identifies the data to be handled by the delegate. This identification is based on the business rules that define the process, which were developed at step 350 and ordered at step 520. Once the data have been identified, the process identifies the data sources and communications links necessary to retrieve the data at step 660. These data sources and communications links were determined at step 370, discussed above in detail in conjunction with FIG. 4. Once identified, the process moves to step 675, where the XML code for the delegate is written. At step 680, the workflow analysis and design process continues at step 580.

If the shape is not a data shape, the process moves to step 615 and determines if the shape is a decision shape associated with a delegate to perform a decision function. Again, this decision is based on the categorization of the required delegate function, or workflow element, made at step 530. If the response is "Yes," at step 640 the process determines what are the consequences of the decision defined in the business rule. For example, again using the lost/stolen card example discussed above, the business rule may be to decide if the customer can get a replacement card by overnight courier. The decision consequences in this example would be "Yes" or "No." However, the decision consequences are not limited to yes-no responses. At step 665, the process determines the workflow delegates that correspond to the decision consequence. Using the example above, a "Yes" consequence may mean the workflow should progress to a display delegate that prompts the customer service representative to notify the customer about a fee for overnight courier delivery. A "No" consequence may lead to a display delegate that prompts the customer service representative to tell the customer that overnight courier delivery is not available to her. Once identified, the process moves to step 675, where the XML code for the delegate is written. At step 680, the workflow analysis and design process continues at step 580.

If the shape is not a decision shape, the process moves to step 620 and determines if the shape is a display shape as categorized at step 530 associated with a delegate to perform a display function. If the result is "Yes," the process moves to step 645 and determines what prompts, if any, should appear on the display screen. The process then moves to step 670 and determines what data, if any, should be collected by the person viewing the screen. Within this step, default values that may populate any data entry fields on the display may also be determined. As a data gathering tool, a delegate associated with the display shape differs from the delegate associated with the data shape. A delegate associated with a data shape in the exemplary embodiment retrieves data that exists somewhere across the enterprise, such as Data Sources 240 (FIG. 2), implementing the features of the exemplary embodiment that allows for communications across a variety of computer platforms when operating a workflow engine to implement the business solution process. A delegate associated with a display shape in the exemplary embodiment can be used to input data not contained in one of the Data Sources 240 (FIG. 2). Once any data gathering has been determined, the process moves to step 675, where the XML code for the delegate is written. At step 680, the workflow analysis and design process continues at step 580.

If the response to step 620 is "No," in other words, the shape is not a display shape, the process moves to step 625 and determines if the shape is a defer shape associated with a delegate to perform a defer function, as categorized at step 530. If the result is "Yes," the process moves to step 650 and determines the queue for deferring the workflow. For example, a consequence of a decision delegate may be that a manual operation is required. As an illustration, using our lost/stolen card example, under a decision logic, a supervisor may need to manually verify the cardholder's identity prior to sending a replacement card. In this case, the decision consequence would link to a defer delegate, that would hold the process until the manual action was performed. From the defer delegate, the workflow would proceed as for any other delegate. In the example above, when the supervisor restarts the workflow, she may get a display screen generated by a display delegate, which then feeds into a decision delegate. Once the appropriate queue has been determined, the process moves to step 675, where the XML code for the delegate is written. At step 680, the workflow analysis and design process continues at step 580.

Additionally, in the exemplary embodiment, the workflow can be modified while at a defer delegate. Workflow elements can be added, removed, or redefined, both at locations in the workflow before and after the defer delegate. Once the defer delegate has been addressed, the workflow continues, as modified. The modified elements that occur in the workflow after the delegate will be acted on. In this way, the workflow can be dynamically modified to address changing processes.

If the response to step 625 is "No," in other words, the shape is not a defer shape, the process moves to step 625 and determines if the shape is a puzzle shape associated with a delegate to perform a workflow call function, as categorized at step 530. If the result is "Yes," the process moves to step 655 and determines what other workflows should be called. It would be common in a business process for workflows to be inter-related. The puzzle shape in the exemplary embodiment allows one workflow to call on another. Once the appropriate workflow has been determined, the process moves to step 675, where the XML code for the delegate is written. At step 680, the workflow analysis and design process continues at step 580. If the result is "No" at step 630, the process moves to step 690 and is terminated. This termination step occurs because, in this exemplary embodiment, each delegate must fit into one, and only one, of the five categories, or shapes for delegate operations.

FIGS. 7a and 7b present exemplary workflow logic diagrams 700 and show examples of each of the five shapes used in the exemplary embodiment. As discussed above in conjunction with FIGS. 3 and 6, in the software implementation of an exemplary embodiment, visual programming techniques, such as VISIO, can be used to design the workflow. This technique employs visual representations of the types of actions that a delegate may carry out. In the exemplary embodiment of the present invention, each shape in the diagram corresponds to a delegate. The connections between delegates map the progression of the workflow. Referring to FIG. 7a, the diagram depicts the beginning section of a workflow, beginning at START 705. The rectangular shape 710 presents a data shape for a data handling delegate. In the example presented in FIG. 7a, a delegate represented by data shape 710 is responsible for retrieving data comprising "Lost Card Info." The sources of this data and communication links to this data would have been determined and XML code developed to carry out this function as described above in conjunction with FIGS. 3–6.

Decision shape 720 illustrates a delegate for segmenting a workflow based on decision consequences. In the example presented in FIG. 7a, the business rule for the process requires that the account status be checked. If the status is "Invalid," the workflow moves to a delegate represented by a display shape 730. Otherwise, the workflow moves to another delegate represented by a decision shape 740, which checks if any agent restrictions exist.

Referring to FIG. 7b, another portion of the same workflow as shown in FIG. 7a is to depicted. Defer shape 750 illustrates the use of a delegate for a deferral action. In the example workflow, decision shape 760 includes a consequence for a "Manual" "Alternative Verification." That consequence moves the workflow to a delegate represented by a display shape 770, notifying the operator seeing the display screen, a customer service representative in this example, that the workflow is being deferred. At the defer shape 750, the workflow holds until the supervisor interacts with the workflow. In the example in FIG. 7b, the supervisor sees an "Approve/Decline" screen 775, which may include a data input field to either approve or decline the verification. After the supervisor inputs the data, the flow would move to a delegate represented by decision shape 780.

The segment of the workflow depicted in FIG. 7b also presents a delegate represented by a puzzle shape 785. In the example illustrated in FIG. 7b, the workflow, at puzzle shape 785, calls on a "Verification" workflow to perform the "Alternate Verification." Once the "Verification" workflow has completely run, the exemplary workflow would continue at decision shape 790.

FIG. 8 presents an exemplary display screen 800 generated by a delegate represented by a display shape for the exemplary embodiment of the present invention. In this example, the display screen appears as a window 810, typical for many software applications operating in a Windows operating system. This exemplary screen 800 includes a prompt 820, which prompts the operator. The exemplary screen 800 is from a lost/stolen card processing workflow and the customer service representative is prompted on what to say to the customer reporting the lost or stolen card. The screen 800 also includes an instruction section 830 and a data entry area 840. As discussed above in conjunction with FIG. 6, the delegate represented by a display shape may include data input into the workflow, data that does not exist elsewhere across the enterprise computer system. The screen 800 also has a data display area 850, which displays data that may have been retrieved by a data shape delegate earlier in the workflow.

FIGS. 7a, 7b, and 8 illustrate a portion of a workflow related to lost or stolen credit cards. Additionally, discussions above use a lost or stolen credit card example to illustrate the workings of an exemplary embodiment of the present invention. The present invention is not limited to this exemplary embodiment or to a lost or stolen credit card process. Embodiments of the present invention would apply to any modeling of a business process using computer software and requiring interaction with computer systems across an enterprise to implement an automated business process.

In view of the foregoing, one skilled in the art would appreciate that the present invention supports implementing a business process management system and method across an enterprise comprising multiple computer platforms. An exemplary computer-based system for implementing business processes can access data existing on one or more of the computer platforms of an enterprise to implement workflows by a workflow engine. A business process can be broken into business rules that define the process. These business rules can then be categorized into work element categories and translated into workflow elements. Data for supporting the workflow can be identified, including sources of that data within the enterprise. Delegates can be designed to implement each individual workflow element. For example, a delegate can be designed to support the retrieval of data from a computer platform other than the platform hosting a workflow engine. These delegates, which typically comprise XML documents, can be assembled and operated as workflow elements to form the workflow processed by the workflow engine.

We claim:

1. A method for implementing a business process on a computer system comprising the steps of:
   developing at least one business rule that describes the business process;
   for each business rule, developing an element of a workflow that implements the business process;
   determining at least one data item for implementing each workflow element;
   identifying sources of each data item from a plurality of computer systems;
   defining a delegate to perform each workflow element, wherein the delegate comprises a computer software program capable of implementing each of the workflow elements;
   representing each delegate by a visual representation comprising a workflow element type representing a function supported by the workflow element wherein each visual representation corresponds to actual computer code for the delegate; and
   arranging each delegate to form a workflow by organizing the visual representation representing the corresponding delegate to order the workflow elements in a manner that corresponds to the order of the business rules in the business process.

2. The method of claim 1 wherein the step of defining a delegate to perform each workflow element further comprises the steps of:
   determining if the workflow element specifies retrieval of the data items from one of the computer systems comprising the identified data sources;
   determining if more than one communications link exists between each of the plurality of computer systems and a computer system comprising a workflow engine;
   if more than one communications link exists, then selecting one of the communications links based on at least one selection criterion; and
   defining the delegate to perform the workflow element, wherein the delegate instantiates an action to retrieve the data item.

3. The method of claim 1 wherein the step of defining the delegate to perform each workflow element comprises determining if the delegate exists in a delegate library maintained by the computer system comprising a workflow engine, wherein the delegate can be reused in a workflow.

4. The method of claim 1 wherein the visual representation comprises a geometric shape associated with a category of the function supported by the workflow element.

5. The method of claim 1 wherein each delegate is defined by an XML document.

6. The method of claim 1 further comprising the step of operating a workflow engine to implement the workflow.

7. The method of claim 6 wherein the workflow can be modified during the step of operating the workflow engine to implement the workflow without restarting the workflow from the beginning of the workflow.

8. A method for implementing a business process for an enterprise, wherein the business process comprises at least one business rule, comprising the steps of:
   developing a workflow element from each business rule of the business process;
   identifying each source of data items for the workflow elements;
   defining a delegate to perform each workflow element, wherein the delegate comprises a computer software program capable of implementing each of the workflow elements;
   representing each delegate by a geometric shape comprising a category for a workflow element type representing a function supported by the workflow element wherein each geometric shape corresponds to actual computer code for the delegate;
   arranging each delegate to form a workflow, by organizing the geometric shape representing the corresponding delegate to order the workflow elements in a manner that corresponds to the order of the business rules in the business process; and
   operating a workflow engine that processes the workflow, wherein at least one of the workflow elements specifies the retrieval by the workflow engine of one of the data items from one of the identified sources.

9. The method of claim 8 wherein the step of defining a delegate to perform each workflow element further comprises the steps of:
   determining if the workflow element specifies retrieval of data from one of the computer systems of the enterprise comprising the identified data sources;
   determining if more than one communications link exists between each of the computer systems and the computer system comprising the workflow engine;
   if more than one communications link exists, then selecting one of the communications links based on at least one selection criterion; and
   defining the delegate to perform the workflow element, wherein the delegate instantiates an action to retrieve the data using the selected communications link.

10. The method of claim 8 wherein the step of defining a delegate to perform each workflow element comprises the step of determining if the delegate exists in a delegate library maintained by the computer system comprising the workflow engine, wherein the delegate can be reused in the workflow.

11. The method of claim 8 wherein each delegate is defined by an XML document.

12. The method of claim 8 further comprising the step of operating the workflow engine to implement the workflow.

13. The method of claim 12 wherein the workflow can be modified during the step of operating the workflow engine to implement the workflow without restarting the workflow from the beginning of the workflow.

14. A system for implementing a computer-based workflow representing a business process, wherein the business process comprises at least one business rule, comprising:
   a first computer, logically connected to a second computer, wherein the first computer comprises a client computer software application operable to receive a delegate comprising a computer software program capable of implementing a workflow element of the computer-based workflow, wherein the workflow element corresponds to a business rule and each delegate is represented by a visual representation corresponding to actual computer code for the delegate.

15. The system of claim 14 wherein the first computer is further operable to receive at least one display image from the second computer, wherein the second computer comprises a workflow engine that operates on the workflow and each display image is displayed on the first computer as a result of the second computer operating on the workflow.

16. A method for implementing a business process for an enterprise, wherein the business process comprises at least one business rule, comprising the steps of:
   developing a workflow element from each business rule of the business process;

defining the functionality of a delegate to perform each workflow element; wherein the delegate comprises a corresponding XML document;

determining if the delegate to perform the defined functionality exists in a delegate library maintained by the computer system comprising a workflow engine;

if the delegate exists in the delegate library, reusing the delegate as a workflow element;

if the delegate does not exists in the delegate library, developing a new XML document for the delegate;

representing each delegate by a visual representation comprising a workflow element type representing a function supported by the workflow element wherein each visual representation corresponds to the XML document for the delegate;

arranging each visual representation of a delegate to form a workflow, wherein the workflow corresponds to an order of the business rules in the business process; and operating a workflow engine that processes the workflow.

17. The method of claim 16 wherein the step of arranging each delegate to form the workflow by organizing the visual representation representing the corresponding delegate to order the workflow elements in a manner that corresponds to the order of the business rules in the business process.

18. A computer readable storage device storing a set of computer-executable instructions implementing a method for implementing a business process for an enterprise, wherein the business process comprises at least one business rule, comprising the steps of:

developing a workflow element from each business rule of the business process;

identifying each source of data items for the workflow elements;

defining a delegate to perform each workflow element, the delegate comprising a computer software program capable of implementing each of the workflow elements;

representing each delegate by a visual representation comprising a workflow element type representing a function supported by the workflow element, each visual representation corresponding to actual computer code for the delegate; and arranging each delegate to form a workflow by organizing the visual representation representing the corresponding delegate to order the workflow elements in a manner that corresponds to the order of the business rules in the business process.

19. The computer readable storage medium of claim 18 wherein the step of defining a delegate to perform each workflow element further comprises the steps of:

determining if the workflow element specifies retrieval of data from one of a plurality of computer systems of the enterprise comprising the identified data sources;

determining if more than one communications link exists between each of the computer systems and the computer system comprising a workflow engine;

if more than one communications link exists, then selecting one of the communications links based on at least one selection criterion; and defining the delegate to perform the workflow element, wherein the delegate instantiates an action to retrieve the data using the selected communications link.

20. The computer readable storage medium of claim 18 wherein the step of defining a delegate to perform each workflow element comprises the step of determining if the delegate exists in a delegate library maintained by the computer system comprising a workflow engine, wherein the delegate can be reused in the workflow.

21. The computer readable storage medium of claim 18 wherein the step of arranging each delegate to form the workflow comprises using a visual representation comprises a geometric shape associated with a category of the function supported by the workflow element.

22. The computer readable storage medium of claim 18 wherein each delegate is defined by an XML document.

* * * * *